March 6, 1956 F. A. MULBARGER ET AL 2,736,921
METHOD AND APPARATUS FOR FORMING SELF-SEALING INNER TUBE
Filed June 24, 1953 2 Sheets-Sheet 1

INVENTORS
FRANCIS A. MULBARGER
WILBUR E. HARRIS
BY Irwin M. Lewis
ATTORNEY

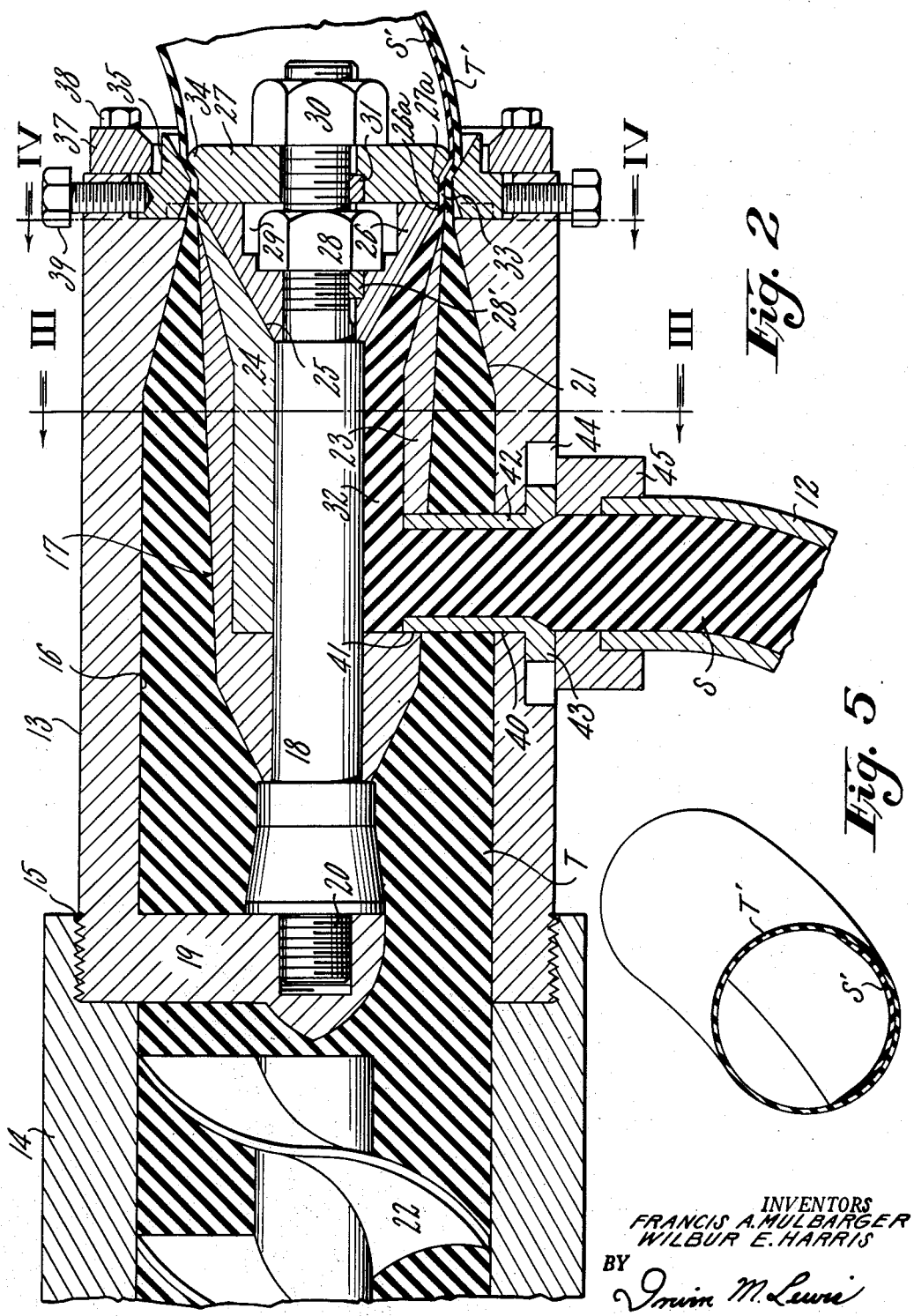

United States Patent Office 2,736,921
Patented Mar. 6, 1956

2,736,921

METHOD AND APPARATUS FOR FORMING SELF-SEALING INNER TUBE

Francis A. Mulbarger and Wilbur E. Harris, Indianapolis, Ind., assignors to United States Rubber Company, New York, N. Y., a corporation of New Jersey Application June 24, 1953, Serial No. 363,874

9 Claims. (Cl. 18—14)

This invention relates to a method and apparatus for manufacturing inner tubes and particularly inner tubes of the self-sealing type incorporating a gummy sealing layer in the interior crown thereof.

Tubes of this type have heretofore been made by either applying a gummy layer to a flat sheet of tube stock and then splicing the longitudinal lateral edges together to form a tube with the sealant layer in the interior thereof or by cutting a formed tube section longitudinally, applying the gummy sealing layer to the interior of the cut tube, and then splicing the cut edges together to reform the tube. Another method that has been proposed, is to apply the gummy layer to the exterior surface of a formed tube section and then turn the tube inside out so that the gummy sealing layer is in the interior of the tube. The advantage of having the gummy sealing layer in the inside of the tube is the elimination of a covering layer for the sealing layer which is necessary if the layer is provided on the exterior surface of the tube.

One object of the present invention is to provide an efficient, comparatievly inexpensive method of and apparatus for manufacturing self-sealing inner tubes of the type in which the sealing layer is incorporated in the interior of the tube.

Another object is to eliminate the cutting, splicing, or turning of the tube inside out that was necessary in the methods heretofore used for forming tubes of this type.

Another object of the invention is to provide apparatus for forming self-sealing inner tubes, which may be easily maintained, repaired and cleaned.

A still further object of the invention is to provide extruding apparatus for forming self-sealing inner tubes, which is so constructed to permit removal and change of parts thereof to vary the dimensions of the formed tube.

According to the present invention, both the tube and the gummy sealing layer are formed and the gummy sealing layer applied to the interior surface of the tube simultaneously. This is accomplished by extruding tube stock through an annular orifice to form a tube and simultaneously therewith extruding self-sealing compound through an arcuate orifice into the interior of the tube as it is formed. The tube with the gummy layer therein is then cut to desired lengths, the ends spliced together to form an annulus, and the resulting annulus vulcanized to form the finished tube.

The apparatus of the present invention is especially constructed to facilitate the forming of self-sealing inner tubes and the parts thereof are specially constructed to permit adjustment thereof or replacement with others of various sizes so that the dimensions of the finished tube can be varied as desired. Particularly, the apparatus is so constructed that the average wall thickness of the tube, as well as the difference in wall thickness between the crown and rim regions of the tube can be readily varied. The density and other properties of tube stock vary from one batch of stock to another. By varying the wall thickness at the time of extrusion, the variation in the properties of the stock can be compensated for so that tubes formed will be of standard weight and quality regardless of the stock used. Variations in the wall thickness may also be desirable to vary the cost and quality of the tubes. Variations in the difference in wall thickness between the crown and rim regions of the tube and careful control thereof is important to compensate for the thinning out of the crown region and the thickening of the rim region of the tube when it is formed into an annular inner tube.

Other objects and advantages of the present invention will become apparent from the following description when read in conjunction with the accompanying drawings wherein:

Fig. 2 is a sectional view of the main extruder of Fig. 1 showing the details of the interior structure of the extruding end thereof and showing the simultaneous extrusion of the tube and the gummy sealing layer;

Fig. 5 is an isometric view of a section of self-sealing inner tube made in accordance with the method of the present invention and by the apparatus of the present invention;

Figure 6:
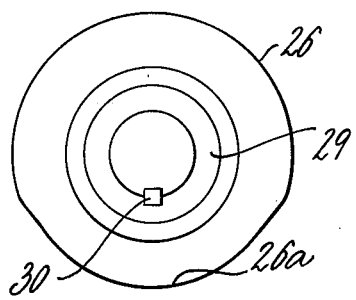
Figure 7:
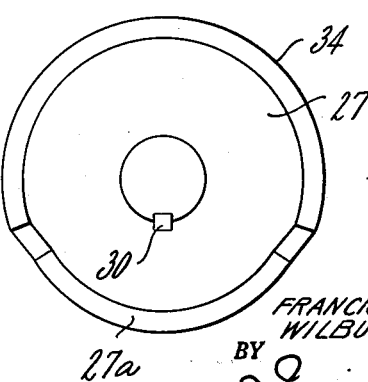

Fig. 6 is an elevational view of the front face of an unassembled frustro-conical plug member which forms one part of the core of the main extruder showing how it is relieved along a portion of its periphery to provide an orifice through which the self-sealing layer is extruded and formed; and Fig. 7 is an elevational view of the rear face of an unassembled flange, annular plate which forms the end of the core of the main extruder showing how it is also relieved along a portion of its periphery to provide an orifice through which the self-sealing layer is extruded and formed.

Figure 1:
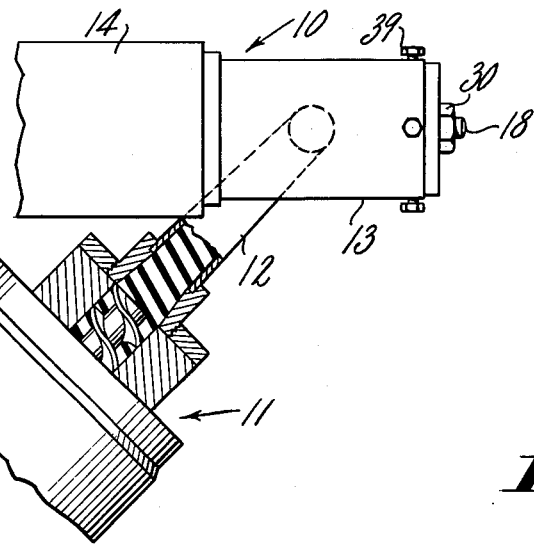
Fig. 1 is a partial plan view of the apparatus of the present invention showing a main extruder for forming the tube and applying the gummy sealing layer and an auxiliary extruder for forcing the gummy sealing compound into the main extruder so that it can be applied as a layer to the interior of the tube as it is formed.

Referring to the drawings and in particular to Fig. 1 of the drawings, the apparatus of the present invention includes a main screw type extruder, generally designated by the reference numeral 10, for forming the tube and applying a layer of gummy sealing compound to the interior of the tube and an auxiliary screw type extruder, generally designated by the reference numeral 11, for forcing the gummy sealing compound through a connecting conduit 12 into the main extruder 10 so that it may be applied to the tube as it is formed.

Referring to Fig. 2, the main extruder 10 includes an extruding head 13 which is attached to the barrel 14 of a conventional screw type extruder by means of threads 15. The head 13 has a bore 16 in which a core member generally designated by the reference numeral 17 is supported in spaced relationship with the wall thereof. The core member 17 is removably supported on a rod 18 which in turn is supported in spaced relationship with respect to the wall of the bore 16 by means of a spider 19. The spider 19 may be formed integral with the head 13 or otherwise secured thereto. The end of the rod 18 is detachably secured to the spider 19 by threads 20.

The bore 16 is tapered towards the discharge end of the extruder and forms in conjunction with the core 17 an annular extruding throat 21 through which suitable inner tube stock T may be forced by screw 22 to form a tube T'. The tube stock T may be of any desired composition commonly used for forming inner tubes.

The core 17 is formed of four parts including an annular outer member 23, an inner member 24 fitted into the outer member 23 and having a frustro-conical recess 25 formed in one end thereof, a frustro-conical plug member 26 which is received in the recess 25 and a flanged, annular plate 27. The members 23, 24 and 26 are supported on the rod 18 and retained thereon by means of a nut 28 threaded on the end thereof and received in a recess 29 formed in the outer end of the plug 26. A key 30 prevents rotation of plug member 26. The flanged annular plate 27 is also supported on the rod 18 and retained thereon by a nut 30 threaded on the end of the rod 18. A key 31 prevents rotation of the plate 27.

Figure 3:
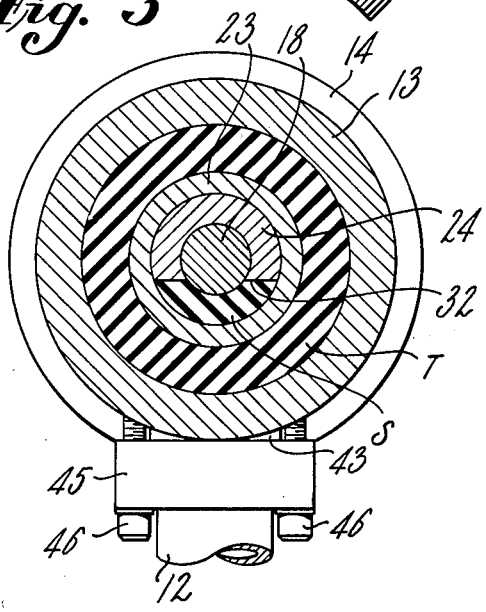
Fig. 3 is a sectional view taken on the line III—III of Fig. 2.
Figure 4:
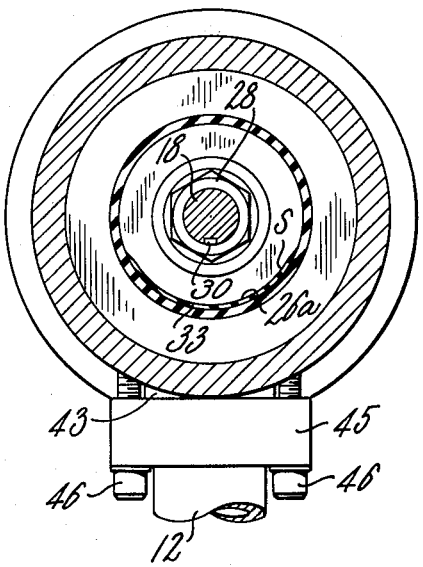
Fig. 4 is a sectional view taken on the line IV—IV of Fig. 2.

The inner member 24 is provided with a longitudinally extending passageway or slot 32 through which the gummy sealing compound S is forced by the auxiliary extruder 11. The cross-sectional shape of the inner member 24 and the passageway or slot 32 formed therein is best shown in Fig. 3.

The frustro-conical plug 26 serves to restrict the passageway 32 and taper it down adjacent the discharge end thereof and it is relieved along a portion of its peripheral edge as shown at 26a in Figs. 5 and 6 to provide an arcuate orifice 33 through which the sealing compound S is forced to form and apply a layer S' thereof to the tube T' as it is formed.

The annular plate 27 is also similarly relieved at 27a as best shown in Fig. 7 to permit the passage of the self-sealing layer therethrough. The annular plate 27 has outwardly tapered flange 34 which is engaged by the stock so that the direction of flow of the stock is slightly changed and the tube slightly expanded. This provides a "snubbing" action, i. e., offers resistance to the free flow of the stock so that the stock is better compacted and the layer S' of sealing compound better adhered to the formed tube T'.

An annular die ring 35, internally tapered to correspond to the taper of the flange 34 of the annular plate 26 is slidably mounted in a slot 36 formed in the end of the head 13 and is retained in the slot by an annular retaining plate 37 secured to the end of the head 13 by bolts 38. The die ring 35 in conjunction with the plate 27 serves to control the final sizing of the tube. The die ring 35 is adjustable radially in the slot 36 by means of screws 39 so that the centricity thereof with respect to the annular plate 27 may be varied as desired to vary the differential wall thickness between the crown of the tube and the rim portion of the tube.

The head 13 is provided with an opening 40 through the wall thereof and outer member 23 of the core 17 is provided with a similar aligned opening 41. A short section of conduit 42 extends through these openings and communicates with the passageway 32 in the inner member 24. The outer end of the conduit 42 is provided with a flange 43 which contacts the surface of a recess 44 formed in the outer surface of the head 13. The conduit 12 extending from the auxiliary extruder 11 has a flange 45 secured to the end thereof which engages the flange 43 of the conduit 42. Bolts 46 extending through openings in the flange 45 and threaded into the wall of the head 13 couple the conduit 12 to the conduit 42 and hold the conduit 42 in place.

It will be noted that all parts of the core 17 may be easily removed for cleaning, repairing or replacement by simply removing the nuts 28 and 30. The die ring 35 may be easily removed by unscrewing the bolts 38. The width or thickness of the sealing layer S' may be easily varied by replacing plug member 26 and plate 27 with similar members having relieved portions 26a and 27a of greater or smaller length or depth. The volume of stock discharged from the extruder and therefore the average wall thickness of the tube may be varied by replacing the annular plate 27 with one of larger or smaller diameter to thereby vary the space between the plate 27 and the die ring 35 and the thickness differential between the crown and rim portions of the tube may be easily varied by shifting the die ring 35 by means of adjusting screws 39.

The tube section as extruded from the apparatus is as shown in Fig. 5. To form a finished inner tube, the tube section is cut to desired length, a valve stem is applied, the ends are spliced together to form an annulus, and the resulting annulus vulcanized in a suitable mold.

From the above description it can be seen that there is presented a simple method of forming inner tubes of the type having a self-sealing layer in the interior thereof which eliminates the cutting, splicing, or the turning inside out that was necessary in the methods heretofore used for forming tubes of this type.

The apparatus of the invention may be easily disassembled for cleaning, repairing and the parts of the core may be readily replaced by similar parts of different sizes so that tubes of various dimensions may be formed.

While certain preferred forms of the invention have been shown and described, it is to be understood that modifications may be made therein without departing from the spirit and scope of the invention.

Having thus described our invention, what we claim and desire to protect by Letters Patent is:

1. Apparatus for forming self-sealing inner tubes comprising, a tube extruder having an extruding bore and a core supported in said bore spaced from the wall of the bore to provide an annular throat, means for forcing tube stock through said annular throat to form a tube, said core being formed of an outer annular member open at the end thereof adjacent the discharge end of the extruder and an inner member secured to and fitted in said outer member, said inner member having a passageway extending longitudinally thereof and having a conical recess formed in the end thereof communicating with said passageway, a conical plug member removably secured in said recess so as to restrict said passageway adjacent the end thereof, said conical plug member being relieved along a portion of its periphery to thereby provide an arcuate orifice and means for forcing sealing compound through said passageway and said arcuate orifice whereby a self-sealing layer is formed and applied to the interior surface of the tube as it is formed.

2. Apparatus for forming self-sealing inner tubes comprising, a tube extruder having an extruding bore and a core supported in said bore spaced from the wall of the bore to provide an annular extruding throat, means for forcing tube stock through said annular throat to form a tube, said core being formed of an outer annular member and an inner member detachably secured within said outer member, said inner member having a passageway extending longitudinally thereof terminating in a restricted arcuate orifice communicating with said throat, means for forcing sealing compound through said passageway into said throat whereby a self-sealing layer may be formed and applied to the interior of said tube as it is formed and an annular die ring adjustably mounted at the discharge end of the tube extruder, and means for radially adjusting said die ring with respect to said core to vary the difference in wall thickness of the tube in the region of the crown and rim portions of the tube.

3. Apparatus for forming self-sealing inner tubes comprising, a tube extruder having an extruding bore and a core supported in said bore spaced from the wall of the bore to provide an annular throat, means for forcing tube stock through said annular throat to form a tube, said core being formed of an outer annular member open at the end thereof adjacent the discharge end of the extruder and an inner member secured to and fitted in said outer member, said inner member having a passageway extending longitudinally thereof and having a conical recess formed in the end thereof communicating with said passageway, a conical plug member removably secured in said recess so as to restrict said passageway adjacent the end thereof, said conical plug member being relieved along a portion of its periphery to thereby provide an arcuate orifice, means for forcing sealing compounds through said passageway and said arcuate orifice whereby the self-sealing layer is formed and applied to the interior surface of the tube as it is formed, an annular die ring adjustably mounted at the discharge end of the extruder, and means for radially adjusting said die ring with respect to said core to vary the difference in wall thickness of the tube in the region of the crown and rim portions of the tube.

4. Apparatus for forming self-sealing inner tubes comprising, a tube extruder having an extruding bore and a core supported in said bore spaced from the wall of the bore to provide an annular throat, means for forcing tube stock through said annular throat to form a tube, said core being formed of an outer annular member open at the end thereof adjacent the discharge end of the extruder and an inner member secured to and fitted into said outer member, said inner member having a passageway extending longitudinally thereof and having a conical recess formed in the end thereof communicating with said passageway, a conical plug member removably secured in said recess so as to restrict said passageway adjacent the end thereof, said conical plug member being relieved along a portion of its periphery to thereby provide an arcuate orifice, means for forcing sealing compound through said passageway and said arcuate orifice into said throat whereby a self-sealing layer is formed and applied to the interior surface of the tube as it is formed, a plate removably secured to the outer face of said conical plug, said plate having an outwardly tapered flange which resists the free flow of the stock to thereby compact the stock as it is extruded.

5. Apparatus for forming self-sealing inner tubes comprising, a tube extruder having an extruding bore and a core supported in said bore spaced from the wall of the bore to provide an annular throat, means for forcing tube stock through said annular throat to form a tube, said core being formed of an outer annular member open at the end thereof adjacent the discharge end of the extruder and an inner member secured to and fitted in said outer member, said inner member having a passageway extending longitudinally thereof and having a conical recess formed in the end thereof communicating with said passageway, a conical plug member removably secured in said recess so as to restrict said passageway adjacent the end thereof, said conical plug member being relieved along the portion of its periphery to thereby provide an arcuate orifice, means for forcing sealing compounds through said passageway and said arcuate orifice into said throat whereby a self-sealing layer is formed and applied to the interior surface of the tube as it is formed, a plate removably secured to said conical plug, said plate having an outwardly tapered flange to resist the free flow of the stock to thereby compact the stock as it is extruded, and annular die ring adjustably mounted at the discharge end of the tube extruder, and means for radially adjusting said die ring with respect to said plate to thereby vary the difference in wall thickness of the tube in the region of the crown and rim portions of the tube.

6. A method of forming self-sealing inner tubes comprising, forcing inner tube stock through an annular orifice to form a tube, and simultaneously therewith forcing a self-sealing compound through an arcuate orifice into the interior of said tube as it is formed and thereafter forcing the tube with the self-sealing compounds therein through an orifice of slightly larger diameter whereby the tube is expanded and the sealing compound is pressed into more intimate contact with the tube.

7. Apparatus for forming self-sealing inner tubes comprising, a tube extruder having an extruding bore open at one end, a core supported in said bore adjacent said one end and spaced from the wall of the bore to provide an annular extruding throat, means for forcing tube stock through said annular throat to form a tube, said core having an opening in the surface thereof spaced inwardly from the end of said core adjacent said one end of said bore, said opening in the surface of said core extending partially around said core and communicating with said annular throat at a point spaced from said one end of the bore, means for forcing sealing compounds through said opening whereby a self-sealing layer is formed and applied to the interior of said tube as it is formed, and means carried by said end of said core for resisting the free flow of said stock to compact said stock and force said sealing compound into intimate contact with the interior surface of said tube.

8. Apparatus for forming self-sealing inner tubes comprising, a tube extruder having an extruding bore open at one end, a core supported in said bore adjacent said one end and spaced from the wall of the bore to provide an annular extruding throat, means for forcing tube stock through said annular throat to form a tube, said core having an opening in the surface thereof spaced inwardly from the end of said core adjacent said one end of said bore, said opening in the surface of said core extending partially around said core and communicating with said annular throat at a point spaced from said one end of the bore, means for forcing sealing compound through said opening whereby a self-sealing layer is formed and applied to the interior of said tube as it is formed, and an outwardly tapered flange on said end of said core for resisting free flow of said stock to compact said stock and force said sealing compound into intimate contact with the interior surface of said tube.

9. Apparatus for forming self-sealing inner tubes comprising, a tube extruder having an extruding bore and a core supported in said bore spaced from the wall of the bore to provide an annular throat, means for forcing tube stock through said annular throat to form a tube, said core having an interior passageway extending longitudinally thereof and having a conical recess formed in the end thereof communicating with said passageway, a conical plug member removably secured in said recess so as to restrict said passageway adjacent the end thereof, said conical plug member being relieved along a portion of its periphery to thereby provide an arcuate orifice, and means for forcing sealing compound through said passageway and said arcuate orifice into said throat whereby a self-sealing layer is formed and applied to the interior surface of the tube as it is formed.

References Cited in the file of this patent

UNITED STATES PATENTS

| Number | Name | Date |
|---|---|---|
| 574,577 | Royle | Jan. 5, 1897 |
| 1,637,207 | Whitehouse | July 26, 1927 |
| 1,933,212 | Gora | Oct. 31, 1933 |
| 2,465,482 | Rhodes | Mar. 29, 1949 |
| 2,521,123 | Lawrence | Sept. 5, 1950 |
| 2,632,205 | Harris | Mar. 24, 1953 |